May 28, 1957 W. E. BELCHER, JR 2,793,813
MEASURING AND CONTROLLING APPARATUS
Filed July 23, 1953 2 Sheets-Sheet 1

INVENTOR.
WALLACE E. BELCHER JR.
BY Arthur H. Swanson
ATTORNEY.

INVENTOR.
WALLACE E. BELCHER JR.

United States Patent Office 2,793,813
Patented May 28, 1957

2,793,813

MEASURING AND CONTROLLING APPARATUS

Wallace E. Belcher, Jr., Bala Cynwyd, Pa., assignor to Minneapolis-Honeywell Regulator Company, Minneapolis, Minn., a corporation of Delaware Application July 23, 1953, Serial No. 369,931

17 Claims. (Cl. 236—15)

The present invention relates generally to improved apparatus for electrically measuring the value of a condition and for producing effects in response to variations in the measured value. More specifically, the invention relates to such apparatus equipped with means operative to prevent the apparatus from producing undesirable actions upon certain intentionally produced changes in the measured value, and/or upon the intentional disconnection of the measuring element from the remainder of the apparatus.

The general object of the present invention is to provide improved electrical measuring and/or controlling apparatus, of the type adapted to be connected to a sensing or measuring element and including responsive means operative to produce effects in accordance with the value of a condition to which said element is responsive, including means operative to prevent the apparatus from undesirably producing certain of its effects upon certain intentionally effected changes in the value of said condition, and/or upon the intentional disconnection of the sensing element from the remainder of the apparatus.

A specific object of the invention is to provide improved apparatus of the type just specified which includes indicating, recording, signalling, and/or controlling means which are normally responsive to the value of said condition, through the medium of said sensing element, to perform their normal functions, and which includes means operative to prevent the first named means from disadvantageously performing their normal functions upon the occurrence of certain changes in said value which are intentionally effected, and/or upon the intentional disconnection of the sensing element from the apparatus.

A more specific object of the invention is to provide apparatus of the last mentioned type including supervisory or safety means normally operative to provide a predetermined, characteristic effect or response upon the open-circuiting of the sensing element, and including means operative to modify the normal operation of said supervisory means whenever said sensing element is open-circuited or disconnected intentionally.

An even more specific object of the invention is to provide an improved electrical measuring and/or controlling apparatus of the type specified generally above including switching means adapted in one position to connect a sensing element, such as a thermocouple, to the apparatus input terminals, and adapted in another position to connect a shut-down component or impedance device, such as a resistor, to the apparatus input terminals in lieu of said sensing element.

Another specific object of the invention is to include said switching means and shut-down resistor in apparatus as just specified which additionally includes means operative to cause a safety effect to be produced when said input terminals have no external circuit completed therebetween, but not when either said thermocouple or said resistor completes said external circuit.

It is also an object of the invention to provide means in apparatus as specified above which are operative to cause said switch to connect said element between said terminals when and only when the device producing the condition, to the value of which said sensing element is responsive, is in normal operating condition, and to connect said component between said terminals in lieu of said sensing element when and only when said device is in the shut-down state and hence is not in operating condition.

Still another object of the present invention is to provide apparatus as above described which is adapted to measure, indicate, monitor, and/or control the values of a plurality of conditions in a cyclically repeated sequence, which is normally adapted to provide indicating, controlling, and/or signalling effects in the presence of certain predetermined values of any of said conditions and/or in the presence of open-circuiting of any of the sensing elements responsive to said conditions, and which is prevented from providing such effects for any condition which is in a shut-down state and has its corresponding sensing element replaced by the corresponding shut-down component.

There are known in the art numerous arrangements wherein a single multiple measuring, indicating, and/or controlling instrument is utilized to measure and/or control the values of the conditions of a plurality of devices, such as the values of the temperatures in a plurality of furnaces. Thus, for example, it is known in the art to utilize a single multiple potentiometric measuring and controlling instrument to measure and control the temperature in each of a plurality of furnaces, such measurement and control being effected sequentially in a predetermined order which is cyclically repeated. In such an arrangement, the control instrument includes the usual single primary control means, and a separate control device is provided for each of the plurality of furnaces to be controlled. Each furnace is provided with a thermocouple or similar sensing element in the usual manner, and the apparatus includes switching means which are operative in synchronism with the instrument input switching means to connect the control device of each furnace to the primary control means within the instrument solely during the successive periods in which the thermocouple of the associated furnace is connected to the input of the instrument. Such an arrangement is operative to cause the multiple instrument to measure and control the temperature of each of the plurality of furnaces in order in a cyclically repeated sequence, whereby the effect is that a single instrument measures and controls the plurality of furnace temperatures simultaneously.

In apparatus of the type just described, as in other automatic temperature control arrangements employing thermocouples or similar sensing elements, it is often necessary to provide so-called automatic thermocouple burnout protection. In a single furnace installation, the burnout problem is readily solved by providing an additional supervisory or burnout component, such as a resistor, in the controlling instrument measuring circuit so that the instrument will drive up scale and shut off or at least reduce the supply of heat to the furnace upon the occurrence of burnout or other open-circuiting of the thermocouple. Apparatus equipped with such protection is well known in the art.

When it is attempted to apply such burnout protection to a multiple control arrangement of the type described above, a problem presents itself which it is an object of the present invention to solve. This problem stems from the fact that not all of the plurality of furnaces in such an arrangement are in normal operation at all times, since it is often necessary or desirable to shut down one or more of the furnaces intentionally at various times and for various reasons while leaving the remainder of the furnaces in normal operation under the automatic control of the instrument. Further, when a furnace is shut down for one or another reason, it is often necessary to remove the thermocouple therefrom and hence to disconnect intentionally the thermocouple from the multiple input switch terminals of the instrument.

Accordingly, when the conventional burnout protection described above is applied to such a multiple control arrangement, the instrument pen will be caused to drive up-scale rapidly each time that the instrument input circuit switch moves into the position corresponding to a shut down furnace which has had its thermocouple intentionally disconnected from the instrument input switch. Such up-scale drive interferes with the normal control of the other furnaces which are still in normal operation, and also causes the actuation of any signals and/or alarms which may be operated by the instrument and which are intended normally to be actuated upon thermocouple burnout and the resulting up-scale instrument drive.

In order to prevent an instrument provided with thermocouple burnout protection from reacting to an intentionally disconnected thermocouple in the same manner as it reacts to a burned-out or otherwise unintentionally open-circuited thermocouple, I propose, according to the present invention, to equip each furnace with an individual shut-down resistor and shut-down switch. In the "operate" position of each of these switches, the switch connects the associated furnace thermocouple in its circuit to the input leads of the multiple input instrument switch in the normal manner. In the "shut-down" position, however, the switch substitutes the associated shut-down resistor for the associated thermocouple across the instrument input terminals. Each shut-down resistor is advantageously made to have a resistance value which simulates an uninterrupted thermocouple circuit between said input terminals whenever the associated shut-down switch is in the shut-down position. Therefore, when any switch is moved to the shut-down position, the instrument cannot detect whether the thermocouple of the associated furnace is or is not electrically connected to the instrument.

Accordingly, when it is desired to shut down a furnace of the group under control and to remove the thermocouple leads from the instrument input terminals, it is only necessary to actuate the shut-down switch into the shut-down position to connect the associated shut-down resistor to the instrument input in lieu of the corresponding thermocouple in order to prevent the subsequent disconnection of the thermocouple from the system from causing the instrument erroneously to indicate a burned-out thermocouple.

While it is feasible to have the shut-down switch manually operable so that an operator can move the switch to the shut-down position whenever the associated furnace is shut down, and then can move the switch back to the operate position when the furnace is put back into normal operation, I have found it to be desirable in some instances to interlock the operation of each shut-down switch with the manual firing controls of the associated furnace in such a manner that the switch will always be in the operate position when and only when the associated furnace can be in normal operation, and so that the switch will always be moved to and maintained in the shut-down position when and only when the associated furnace is not being normally operated or is shut down and its thermocouple is therefore likely to be disconnected intentionally.

In installations of the above type where the instrument only measures the furnace temperatures but does not control them, the use of the improvement of the present invention will prevent intentionally shut down furnaces from causing the instrument to respond and erroneously indicate the presence of a burned-out thermocouple.

Moreover, instruments of the type discussed above are often equipped with one or another type of monitoring or limit detecting devices which are operative to actuate an alarm or effect other appropriate control actions when the measured temperature of any of the furnaces falls outside of a predetermined range. Such monitoring arrangements may be used separately from or in combination with thermocouple burnout detecting means. In any case, the use of the shut-down resistor and switch of the present invention prevents the monitoring apparatus from improperly indicating an improper temperature value for a furnace which has been intentionally shut down or otherwise prevented from operating normally.

The present invention also contemplates the selection of appropriate values for the aforementioned shut-down resistors, whereby the instrument pen can be made to move to any desired position, such as a position within the normal operating range of the associated furnace, whenever the furnace is intentionally shut down and its resistor is connected to the instrument in lieu of the corresponding thermocouple.

The apparatus of the present invention may also be used to advantage in combination with other forms of measuring apparatus including types of thermocouple burnout detecting means which differ substantially from the means described above. Thus, for example, the invention may be used to advantage with thermocouple burnout means of the known type wherein an oscillator circuit and associated means detects and signals the presence of any interrupted thermocouple circuit in a group of tested circuits. The use of the present invention in combination with such an arrangement prevents the apparatus from falsely detecting and signalling the presence of a thermocouple circuit which has been interrupted intentionally.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which I have illustrated and described preferred embodiments of the invention.

Figure 1:
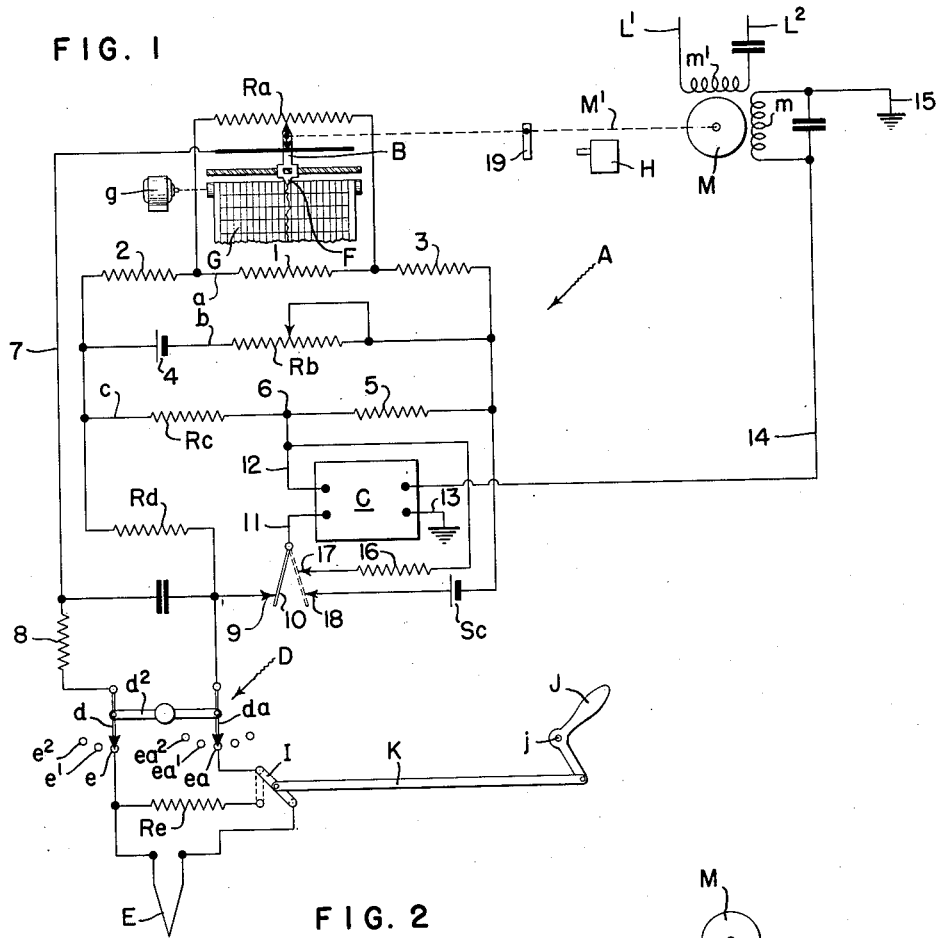
Fig. 1 is a circuit diagram illustrating one embodiment of the present invention.

In Fig. 1, I have illustrated by way of example an arrangement according to the present invention wherein a self-balancing potentiometric measuring instrument of a well-known type is utilized to measure and record the values of a plurality of temperatures. These temperatures may well be those of a plurality of furnaces. Each temperature is measured by a thermocouple which is individual to the corresponding one of the furnaces, and the thermocouples are arranged to be individually connected to the measuring input of the instrument through a suitable selector switch. The latter may be actuated manually so that the various thermocouples can be selectively connected to the instrument at the will of an operator, or the switch may be actuated automatically to connect the thermocouples to the instrument input in a predetermined order which is cyclically repeated. For convenience of illustration, only one thermocouple is actually shown in the Fig. 1 arrangement now to be described.

The apparatus shown by way of example in Fig. 1 comprises an instrument of the type disclosed in the Wills Patent No. 2,423,540 which includes a self-balancing, potentiometric bridge, measuring circuit A. The latter comprises a slide wire branch $a$, an energizing branch $b$, and a calibrating branch $c$, and is a typical "split" potentiometer circuit. The slide wire branch $a$ includes a slide wire resistor $Ra$ which is shown as being connected in parallel with a resistor 1 and in series with and between resistors 2 and 3. The circuit branch $a$ is connected in series with the energizing circuit branch $b$. The latter includes a battery 4, or other source of a small D. C. voltage, connected in series with a variable resistor $Rb$. The branch $c$ is connected in parallel with the branches $a$ and $b$, and comprises resistors $Rc$ and 5 connected in series with one another, each of these resistors having one end terminal connected at a junction point 6 to one end terminal of the other resistor. The remote terminals of the resistors $Rc$ and 5 are respectively connected to the resistors 2 and 3.

A slider contact B, which is in engagement with and adjustable along the length of the slide wire resistor $Ra$, is normally connected to the point 6 by a circuit branch including a conductor 7, a resistor 8, an input or thermocouple selector switch D, a thermocouple E, a switch contact 9, a switch blade 10, and the terminals 11 and 12 of the input circuit of an electronic amplifier C. As shown, the terminals $e$ and $ea$ of the thermocouple E are connected to the resistor 8 and contact 9 respectively, through the switch blades $d$ and $da$, respectively, of the switch D. The switch blades $d$ and $da$ are connected by a bar $d^2$ carrying a knob or other actuating device through which the switch D may be manually or automatically adjusted to move the blades $d$ and $da$ into and out of operative engagement with the thermocouple terminals $e$ and $ea$. The switch blades $d$ and $da$ may be angularly adjusted to engage other sets of thermocouple terminals $e'$ and $ea'$, $e^2$ and $ea^2$, etc., for connecting a plurality of thermocouples successively to the bridge circuit A. The circuit including the conductor 7, resistor 8, thermocouple E, switch contact 9, switch blade 10, and the input circuit of the amplifier C may be called a "detector circuit."

One output terminal, 13, of the amplifier C is connected to ground, and the other output terminal, 14, is connected to one end of a motor winding $m$ which has its other end connected to ground by a conductor 15. The winding $m$ has a suitable condenser connected thereacross, and forms the control winding of a two-phase, reversible, alternating current motor M also having a power winding $m'$ connected between alternating current supply conductors $L'$ and $L^2$ in series with a suitable condenser.

In the normal, balanced condition of the measuring apparatus just described, the voltage of the thermocouple E is equal and opposite in direction to the voltage between the contact B and the bridge circuit point 6. On an increase or decrease in the thermocouple voltage, unidirectional current flows in one direction or in the opposite direction through the input circuit of the amplifier C. Such current flow energizes the motor M for rotation in the proper direction to move the contact B along the resistor $Ra$ in the direction and to the extent required to rebalance the measuring apparatus. As diagrammatically shown, the motor M adjusts the contact B through an adjusting element M' which also moves a recorder pen F up or down scale over a recorder chart G simultaneously with its adjustment of the contact B. The chart is advanced by a chart motor $g$ in the usual manner. This operation of the measuring apparatus is fully described and explained in detail in the aforementioned Wills patent.

As shown, the bridge circuit A includes calibration means comprising a resistor 16 having one end connected to the bridge point 6 and having its other end connected to a switch contact 17, and comprising an associated switch contact 18 connected through a standard cell $Sc$ to the end of the bridge resistor 5 remote from the point 6. In the calibrating operation, the switch blade 10 is turned out of engagement with the contact 9 into the position in which it connects the contacts 17 and 18. When those contacts are connected, the voltage of the standard cell $Sc$ is opposed by the voltage drop across the bridge resistor 5. In practice, the apparatus is ordinarily so arranged that the movement of the motor M, effected during the calibrating operation, will suitably vary the effective resistance of the resistor $Rb$ so as to make the voltage drop in the resistor 5 equal in magnitude to the voltage of the standard cell $Sc$, thereby calibrating the apparatus.

As those skilled in the art will recognize, the apparatus just illustrated and described is of the well known and widely used type and form disclosed and claimed in the Wills patent previously mentioned.

A resistor $Rd$ is connected between the connected terminals of the resistors 2 and $Rc$ and the contact 9 to form a so-called "resistor" thermocouple burnout circuit which creates a current flow through the input circuit of the amplifier C when the thermocouple E burns out or breaks or is otherwise open-circuited. That current flow operates the motor M to move the contact B up-scale just as it would move on an increase in the thermocouple voltage and temperature. The up-scale movement of the contact B initiated by the resistor $Rd$, whenever the external circuit between the switch blades $d$ and $da$ is interrupted, continues until the contact B engages the usual stop or arresting device at the right-hand or up-scale end of the slide wire $Ra$, since the apparatus is not rebalanced by such movement of the contact B under this condition. In the course of such movement of the contact B, a signalling or controlling device H of some suitable type will ordinarily be actuated, as by means of a projection 19 carried by the element M'.

To effect the adjustment of the contact B into some predetermined intermediate position along the resistor $Ra$ when the thermocouple E has been intentially disconnected from the circuit, a shut-down resistor $Re$ is arranged for connection between the thermocouple terminals $e$ and $ea$. As shown, the arm of a shut-down switch I is adjustable between an "operate" position, shown in full lines, in which the switch connects the thermocouple terminal $ea$ to the thermocouple E, and a "shut-down" position, shown by dotted lines. In its dotted line position, the switch arm I no longer connects the thermocouple terminal $ea$ to the thermocouple E, but instead connects the terminal $ea$ to one end of the resistor $Re$. The other end of that resistor is permanently connected to the thermocouple terminal $e$ as shown. The effect of thus adjusting the shut-down switch I into the shut-down position is to replace the thermocouple E by the resistor $Re$ between the terminals $e$ and $ea$. By a suitable selection of the relative resistance values of the resistors $Rd$ and $Re$, the conjoint effect of the voltage drops in these resistors may be made that required to make the potential at the contact 9 equal to the potential of the point 6 for any desired position of the contact B along the resistor $Ra$.

As shown, the switch I may be manually adjusted back and forth between its full line or operate position and its dotted line or shut-down position by a manually adjustable lever J. The latter is connected by a link K to the switch I so that said switch may be adjusted between its operate and shut-down positions by turning the lever J about its supporting pivot $j$.

With the switch I of Fig. 1 adjusted into its dotted line or shut-down position, the measuring circuit will balance at a point on the scale which may be selected at will. The resistors $Rd$ and $Re$ are responsible for this action, and their resistance values may be determined approximately by the following formula:

$$\frac{Re}{Rd} = \frac{E}{Rc}$$

where E equals the millivolt equivalent, based on 75° F., of the point on the scale at which balance is desired. Values of the resistors $Rd$ and $Re$ may range between 5,000 and 10,000 ohms. This lower limit of 5,000 ohms is selected as being significantly larger than any of the resistances of the other resistors of the circuit A. Under this condition, the foregoing formula is approximately correct. The higher values cause less error in calibration and cause slower speed operation when driving to give shut-down indication. With the switch I in its full line or operate position shown in Fig. 1, the measuring instrument contact B will move rapidly up-scale when the thermocouple circuit breaks, burns out, or is otherwise opened.

As is readily apparent from the foregoing description, the apparatus of Fig. 1 will be operative to measure the temperature of the thermocouple E, as long as the thermocouple selector switch members $d$ and $da$ contact the respective terminals $e$ and $ea$, providing that the switch I is maintained in the operate position, and that the thermocouple E remains intact. Similarly, the apparatus will be operative to measure the temperatures of the other thermocouples, not shown, which may be connected with their corresponding shut-down resistors R$e$ and switches I between the terminals $e'$, $ea'$, etc., providing that these other switches I are maintained in the operate position, and that these other thermocouples remain intact.

Upon the open-circuiting of any one of the thermocouples, however, assuming that the corresponding shut-down switch is in the operate position, the burnout resistor R$d$ will cause the contact B to be driven up-scale to actuate the burnout signalling device H in the conventional manner whenever the faulty thermocouple is connected to the circuit A by the switch D. Also, if the apparatus provides a monitoring operation on the various temperatures of the thermocouples, as by the use in the known manner, for example, of one or more limit detecting or monitoring devices of the type of the device H but located at desired positions along the path of the member 19 for actuation thereby when the temperature being measured at any time is outside of a predetermined range, any temperature outside of the predetermined range will cause the monitoring means to effect its function in the conventional manner whenever the switch D connects the associated thermocouple to the circuit A, providing that the associated shut-down switch is in the operate position.

When it is known that a particular thermocouple is likely to be intentionally disconnected from its corresponding instrument terminals, as occurs when the associated furnace is intentionally shut down, for example, or when it is known that the temperature of a particular thermocouple is likely to be intentionally out of the normal temperature range therefor, the shut-down switch I associated with the thermocouple in question is advantageously adjusted manually into the shut-down position. This operation causes the associated shut-down resistor R$e$ to be substituted for the particular thermocouple, whereby the subsequent intentional disconnection of the latter from the apparatus will leave the detector circuit intact through the corresponding resistor R$e$, and will not cause the burn-out resistor to drive the contact B falsely up-scale to the burnout indicating position when the corresponding terminals $e$ and $ea$, etc., are connected to the circuit A.

In the case of a temperature monitoring arrangement, the actuation of the shut-down switch to the shut-down position for a furnace which is to be intentionally shut down or otherwise operated abnormally will prevent the monitoring means from signalling or controlling, as it would in the case of a temperature which is accidentally outside of its normal range, when the corresponding terminals $e$ and $ea$, etc., associated with the furnace of abnormal temperature are connected by the switch D to the circuit A. This desirable operation is obtained by so arranging the relative values of the resistors R$d$ and R$e$ as to cause the particular shut-down resistor R$e$ to effect the positioning of the contact B within the normal temperature range for the thermocouple replaced by the last mentioned resistor.

In each case, therefore, the actuation, into the shut-down position, of the switch I of a furnace to be shut down or otherwise operated abnormally prevents the subsequent intentional absence or abnormal temperature of the associated thermocouple from causing the respective thermocouple burnout detecting or monitoring means to effect its normal signalling or controlling function, and hence prevents the apparatus from providing false indications of trouble in the presence of intentional abnormalities.

When a shut down furnace is to be put back into normal operation, it is only necessary to return the associated shut-down switch I to the operate position, whereafter the temperature of the associated thermocouple will be measured and/or monitored as before, and thermocouple burnout supervision will be restored.

It is apparent that the thermocouple burnout means or the monitoring means of apparatus of the type being described will be incapable of detecting an open-circuited thermocouple or an abnormal temperature when the associated switch I is in the shut-down position and has replaced the associated thermocouple with the corresponding shut-down resistor. Accordingly, it is important that the shut-down switches be maintained in their operate positions at all times at which the corresponding thermocouples and temperatures are to be supervised, and that the switches I are only actuated into their shut-down positions when the associated furnaces are shut down or have their operation supervised by other means. Also, to prevent false indications of intentional abnormal conditions, it is important that the shut-down switches be actuated into their shut-down positions at all times at which the associated furnaces are to be shut down or intentionally operated abnormally. Therefore, it will be desirable in some instances to provide a means for assuring positively that the shut-down switches will be properly actuated as the corresponding furnaces are removed from and placed in normal operation. One type of such a means is illustrated by way of example in Fig. 2.

Figure 2:
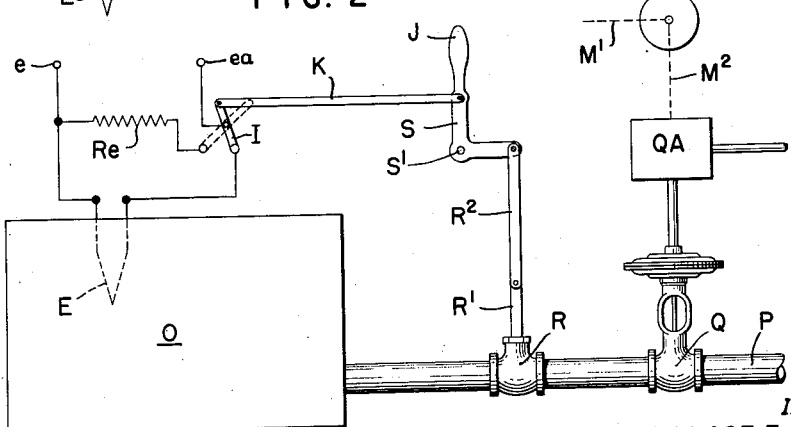
Fig. 2 illustrates apparatus advantageously added in some cases to the apparatus shown in Fig. 1.

In the apparatus modification shown in Fig. 2, the shut-down switch I associated with the illustrated thermocouple E is interconnected mechanically with a shut-down or cut-off valve R located in the fuel supply line P of a furnace O whose temperature is measured and/or monitored by the thermocouple E and associated apparatus. Specifically, the Fig. 2 arrangement includes a bell crank lever S which is pivotally mounted at S' and which carries a manual actuating handle J. Movement of the handle J to the right in Fig. 2 actuates the switch I into the shut-down position through the linkage K, and simultaneously actuates the shut-off valve R into the closed position through a linkage R$^2$ connected between one arm of the lever S and the stem R' of the valve R. Movement of the handle J to the left in Fig. 2 opens the shut-off valve R and returns the switch I to the operate position. Therefore, the actuation of the switch I to the shut-down position is assured whenever, but only whenever, the supply of fuel to the furnace O is interrupted by manipulation of the manual shut-down valve R, and the actuation of the switch I to the operate position is assured whenever, but only whenever, the valve R is open and the furnace O can operate normally.

Although only one thermocouple E, furnace O, shut-down switch I, shut-down valve R, shut-down resistor R$e$, and associated components are shown in Fig. 2, it is to be understood that a plurality of sets of such components may be provided as in the case of the Fig. 1 arrangement, and that each furnace O and thermocouple E will have their own corresponding elements R$e$, I, J, K, S, R, R', and R$^2$ associated therewith in the same manner as for the illustrated single group of such components.

The Fig. 2 arrangement also illustrates apparatus for effecting the automatic control of the temperature of the furnace O through the medium of the measurements made by the thermocouple E and the self-balancing measuring apparatus including the circuit A, amplifier C, and motor M. To this end, the fuel supply line P to the furnace O is equipped with a control valve Q of the well-known diaphragm motor type which is controlled directly by an air controller QA. The latter is controlled in turn by the motor M through a mechanical linkage $M^2$ in accordance with any difference between the furnace temperature, as sensed by the thermocouple E, and a predetermined set point temperature. The control of the temperature of a furnace in the manner is disclosed in the aforementioned Wills patent.

In the operation of the automatic furnace temperature control arrangement of Fig. 2, deviations in the furnace temperature above and below the set point value will reposition the contact B and the linkage $M^2$ and hence will cause the controller QA to adjust the valve Q as necessary to return the furnace temperature to, and maintain the latter at, the set point value. The motor M will advantageously be arranged to control the valve Q of the furnace O at all times at which the switch D connects the thermocouple E to the measuring circuit A.

Where a plurality of furnaces O are to have their temperatures automatically controlled by the apparatus including the motor M, use may advantageously be made of switching means of known type located in the linkage $M^2$ which will be arranged to operate in a predetermined, cyclically repeated sequence in step with the switch D to connect the motor M through the linkage $M^2$ to whichever of the controllers QA has the thermocouple of its associated furnace O connected through the switch D to the apparatus at any given time. Thus, the motor M will be arranged to control the valve Q of whichever of the furnaces O has its thermocouple E connected by the switch M to the circuit A at any given time. Accordingly, the single instrument including the circuit A, amplifier C, and motor M will be operative to control automatically the temperatures of a plurality of furnaces O in a predetermined, cyclically repeated sequence as long as each switch I and corresponding valve R are maintained in the operate position. The actuation of any one of the switches I to the shut-down position will not only remove the corresponding thermocouple E from the circuit and replace that thermocouple with the corresponding shut-down resistor R$e$, but will also interrupt the automatic control of the temperature of the associated furnace O by causing the closing of the associated shut-off valve R.

The apparatus of the present invention may also be used to advantage with other types of measuring and/or controlling arrangements including means of types other than that employed in the apparatus of Figs. 1 and 2 for detecting interrupted sensing element circuits. Thus, for example, the apparatus of the invention may advantageously be combined with apparatus of the type disclosed in the Stanton Patent No. 2,576,892 which includes a thermocouple burnout detecting or supervisory portion of a type which is quite different from the supervisory portion of the apparatus of Figs. 1 and 2. Such a combination of the apparatus of the present invention with apparatus of the type disclosed in said Stanton patent is illustrated by way of example in Fig. 3, now to be described.

Figure 3:
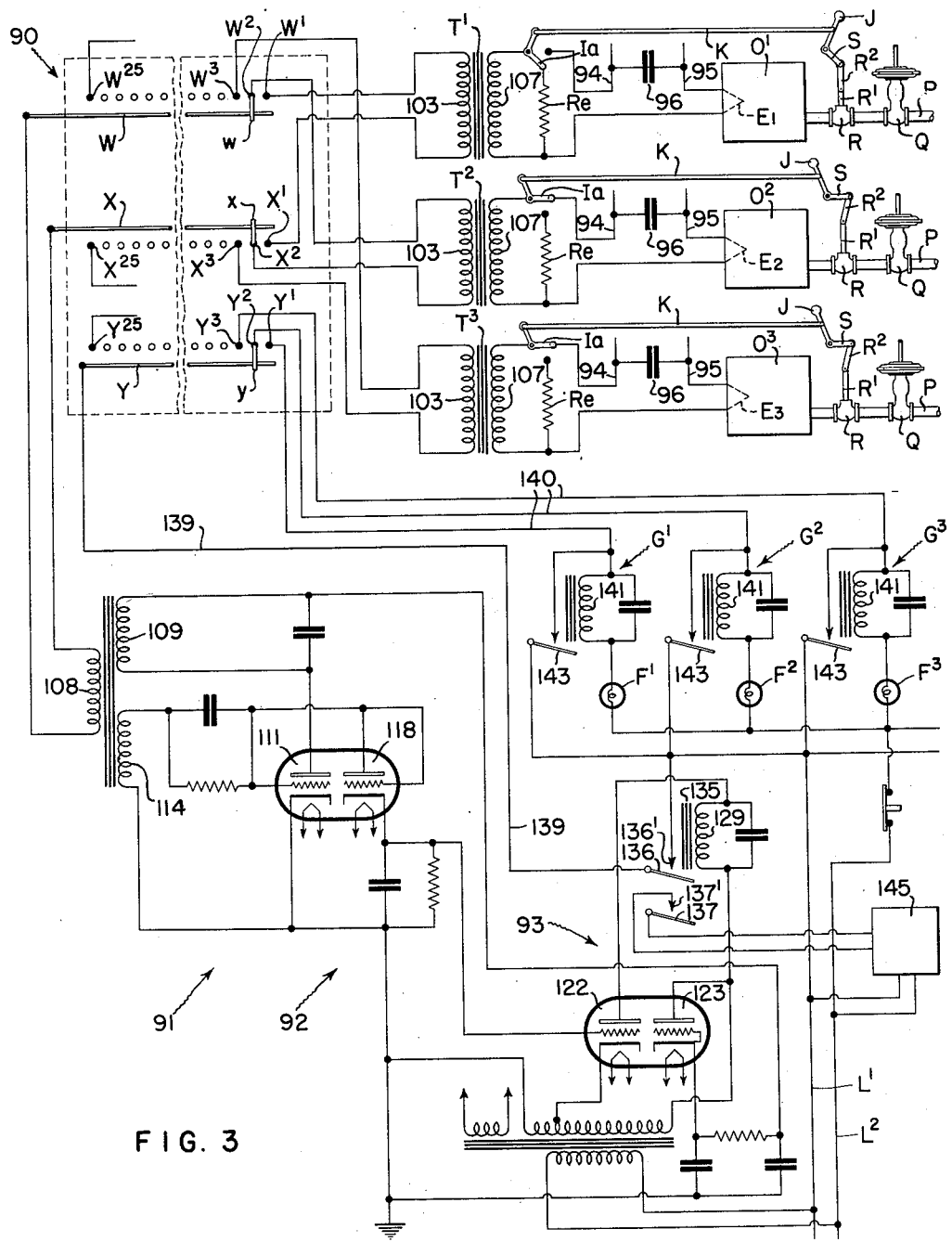
Fig. 3 is a circuit diagram of another embodiment of the invention.

The arrangement of Fig. 3 comprises the combination of a form of sensing circuit supervisory scanning means with means according to the present invention for automatically replacing the sensing element of an intentionally inoperative condition-producing device with an impedance device, or resistor, having the value required to simulate the presence of a completed sensing circuit whenever the scanning apparatus connects the impedance device to the sensing circuit supervisory means. As shown, the Fig. 3 apparatus is adapted to measure the outputs, and supervise the completeness or continuity, of a plurality of thermocouples E1, E2, E3, etc., each of which is responsive to the temperature in a corresponding one of a plurality of furnaces O', $O^2$, $O^3$, etc.

The measurement of the temperature of each of these furnaces is accomplished by connecting the associated thermocouple in a sensing circuit to the input of a suitable responsive means or measuring device, not shown, which responds to the thermocouple output E. M. F. and is arranged to provide a measure of the thermocouple and furnace temperature. Each of these measuring devices may be of any suitable type, and may, for example, be of the type shown in Fig. 1. Alternately, a single measuring instrument of the type illustrated in Fig. 1 may be used in combination with suitable switching means, such as the switch D of Fig. 1, to replace the aforementioned plurality of separate measuring devices and to measure the temperatures of the furnaces O', $O^2$, $O^3$, etc. sequentially. Additionally, such measuring or responsive means, of either plural or single form, may advantageously control the temperatures of the furnaces O', $O^2$, $O^3$, etc. in any desired manner, such, for example, as the manner illustrated in Fig. 2.

The sensing circuit for the thermocouple E1 includes a conductor 94 which is adapted to connect one input terminal of a measuring or responsive device, not shown, through the winding 107 of a supervisory apparatus transformer T' to one terminal of the thermocouple E1 whenever a shut-down switch I$a$ is in the operate position. The other terminal of the thermocouple is connected by a conductor 95 to the remaining input terminal of the measuring device. A condenser 96 is connected between the conductors 94 and 95 to prevent the supervisory means from detecting an incomplete sensing circuit merely because of loss of continuity of the input connections to the measuring device.

When the switch I$a$ associated with the thermocouple E1 is in the shut-down position, which is the position illustrated in Fig. 3, the sensing circuit is disconnected from the transformer winding 107 of the supervisory means, and a shut-down resistor R$e$ is connected across the winding 107 in place of the sensing circuit. The resistance of the resistor R$e$ is advantageously that required to simulate the presence of a completed sensing circuit across the winding 107 whenever the switch I$a$ is in said shut-down position.

The specific apparatus illustrated in Fig. 3 is intended for use with twenty-five thermocouples and associated sensing circuits. Each of these circuits may well be the same as the circuit for the thermocouple E1 as described above, having associated therewith a corresponding switch I$a$, resistor R$e$, and transformer winding 107. In order to avoid undue complication of the drawing, only three of such sensing circuits and associated elements are shown in Fig. 3.

The transformer T', as well as the corresponding transformers $T^2$, $T^3$, etc. for the other sensing circuits, has a winding 103 which is adapted to be connected by a multiple scanning switch mechanism 90 to the supervisory or detecting means per se. To this end, the winding 103 of each of the transformers T', $T^2$, $T^3$, etc. has one terminal connected to a corresponding one of a series of contacts W' through $W^{25}$, and has its other terminal connected to a corresponding one of a series of contacts X' through $X^{25}$. These contacts are included in the switch 90.

As diagrammatically shown, each of the contacts W' through $W^{25}$ is adapted to be connected to a common contact bar W by a bridging contact $w$ which is adapted to be cyclically moved over these contacts to engage each of them periodically in a cyclically repeated sequence. Similarly, a bridging contact $x$ is adapted to be moved over the contacts X' through $X^{25}$, in synchronism with the movement of the contact $w$, to connect each of the contacts X' through $X^{25}$ to a common contact bar X at the times in which the corresponding one of the contacts W' through $W^{25}$ is connected to the bar contact W. Suitable means for effecting such motion of the contacts $w$ and $x$ is shown and described in the aforementioned Stanton patent.

Included in the Fig. 3 apparatus is an oscillator portion 91, a detector portion 92, and a control portion 93. The oscillator 91 includes a triode electron tube 111, mutually coupled coils 109 and 114, and other components, all of which are interconnected to form an oscillator circuit which is permitted to oscillate only in the absence of a completed circuit connected across a coil 108 which is coupled to the coils 109 and 114. The coil 108 is connected between the bar contacts W and X, whereby the oscillator 91 is prevented from producing an oscillating output signal as long as the switch 90 consecutively connects either completed sensing circuits or the resistors R$e$ across the coil 108 and hence loads the oscillator circuit and prevents the oscillation thereof. Upon the connection of an incomplete or interrupted sensing circuit to the oscillator 91 by the switch 90, the oscillator is operative to produce an output signal indicative of a defective thermocouple or otherwise incomplete sensing circuit.

The signal produced by the oscillator 91, upon the connection thereto of an incomplete sensing circuit, is detected by the detector 92, which is connected to the output of the oscillator and which includes a diode-connected triode electron tube 118 and other associated components. Upon the detection of such a signal, the detector is operative to actuate the control portion 93 to cause the latter to provide a suitable indication. The portion 93 is connected by the detector 92 to the oscillator output, and includes a triode electron tube 122, a diode-connected triode electron tube 123, and other associated components which are interconnected so as to cause the operative energization of a relay 135 upon the detection of an interrupted sensing circuit and the appearance of the resulting oscillator output signal. The relay 135 has an operating winding 129 which is connected in the load circuit of the triode 122, and has normally-open contacts 136 and 136' which are included in a selective indicating portion of the apparatus. The relay 135 also has normally-open contacts 137 and 137' which are included in circuit with an alarm device 145, and which cause the actuation of the latter upon the detection of an interrupted sensing circuit.

The indicating portion of the apparatus includes a plurality of relays G', G², G³, etc. and associated signal lamps F', F², F³, etc. A corresponding one of these relays and a corresponding one of these lamps are individually associated with each of the furnaces and its thermocouple, sensing circuit, and associated equipment, and are operative to provide a suitable indication whenever the apparatus has detected that the corresponding sensing circuit is interrupted.

To this end, the relay contact 136 is connected by a conductor 139 to the contact bar Y of a section of the switch 90 having contacts Y' through Y²⁵ and a bridging contact $y$. Each of the contacts Y' through Y²⁵ is connected by a separate conductor 140 to one end of the operating winding 141 of the corresponding one of the relays G', G², G³, etc., and the contact $y$ is adapted to be moved in synchronism with the contacts $w$ and $x$ so as to cause the conductor 139 to be connected at any given time to the winding of the particular relay which corresponds to the particular sensing circuit which is connected to the oscillator 91 at that time. The remaining terminal of the winding 141 of each relay is connected through the corresponding one of the lamps F', F², F³, etc. to one terminal L² of a source of apparatus energizing voltage, the other terminal L' of which is connected to the relay contact 136'. A separate hold-in contact means 143 is connected in circuit with each of the relays G', G², G³, etc., and is operative to maintain the corresponding relay in the energized condition, once it has been placed in that condition by the closing of the relay contacts 136 and 136', until a normally closed switch in one of the energizing conductors is opened.

When all of the shut-down switches I$a$ are in their operate positions, the connection of an incomplete sensing circuit to the supervisory apparatus by the scanning means will cause the appearance of an oscillating signal and the resulting momentary closure of the relay contacts 136—136', and 137—137'. As a result, the alarm device 145 will be actuated, and the corresponding one of the relays G', G², G³, etc. will be energized and held in to maintain the illumination of the corresponding one of the lamps F', F², F³, etc., thereby providing an indication of which of the sensing circuits is defective. This operation is described in detail in the aforementioned Stanton patent, and need not be elaborated on further herein.

When it is known that any one of the sensing circuits of the thermocouples E1, E2, E3, etc. is likely to be interrupted, or when it is desired for some other reason to render the apparatus incapable of detecting the interruption of a particular sensing circuit, the shut-down switch I$a$ associated with that circuit is advantageously moved into the shut-down position, whereby the associated one of the resistors R$e$ is substituted for the particular sensing circuit across the corresponding one of the windings R$e$. Since the resistance of each of the resistors 107 is so chosen as to cause each resistor to simulate the presence of a completed sensing circuit connected across the corresponding winding 107 whenever the associated switch I$a$ is moved to the shut-down position, such actuation of any of the switches I$a$ into the shut-down position will allow the corresponding sensing circuit to be intentionally interrupted, as by the intentional removal of its thermocouple, without causing the supervisory means to detect the interrupted circuit and to actuate the signalling and alarm devices falsely.

As soon as it is desired to place a shut-down circuit under supervision once more, it is only necessary to actuate the corresponding one of the switches I$a$ back into the operate position, whereafter the apparatus will signal the interruption of such a circuit as before.

If desired, each of the switches I$a$ of the Fig. 3 apparatus may be interlocked with the firing controls of the associated furnace in the same manner as illustrated in Fig. 2. Accordingly each of the switches I$a$ of Fig. 3 is shown as being actuated by a handle J through a linkage K, the handle J also actuating a shut-off valve R for the associated furnace through members R¹, R², and S as in the Fig. 2 arrangement. The operation of these portions of the Fig. 3 apparatus is the same as that described hereinbefore in connection with the corresponding portion of the Fig. 2 arrangement.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In electrical measuring apparatus including a pair of input terminals adapted to have connected therebetween a sensing circuit including a sensing element having an electrical characteristic the value of which is dependent upon the value of a condition to which said element is adapted to be subjected, responsive means connected between said terminals and responsive to the value of said characteristic when said element is connected in said circuit between said terminals, and supervisory means adapted to be connected to said sensing circuit and operative, when so connected, to produce a characteristic effect in the absence of a completed sensing circuit through said element, the improvement comprising an impedance device having a predetermined impedance value, electrical switching means, connections between the latter, said supervisory means, said circuit, and said device, said switching means being operative in one position to connect said circuit to said supervisory means, and being operative in a second position to connect said device in lieu of said circuit to said supervisory means, said impedance value of said device being that required to stimulate the presence of a completed sensing circuit connected to said supervisory means when said switching means is in said second position, supply means adapted to supply a medium which determines the value of said condition, control means connected to said supply means and operative in one position to permit the supply of said medium by said supply means, and operative in a second position to prevent the supply of said medium by said supply means, and interlocking means interconnecting said control means and said switching means and operative to cause either of the two last mentioned means to occupy its said one position whenever the other of said two last mentioned means occupies its said one position, and to cause either of said two last mentioned means to occupy its said second position whenever the other of said two last mentioned means occupies its said second position.

2. Apparatus as specified in claim 1, wherein said sensing element is a thermocouple, wherein said impedance device is a resistor, and wherein the resistance of the latter simulates the presence of an intact thermocouple connected to said supervisory means when said switch is in said second position.

3. Apparatus as specified in claim 2, wherein said supervisory means comprises a resistor connected to said responsive means and operative to cause the latter to provide a predetermined, characteristic response in the absence of a completed sensing circuit connected to said supervisory means and to said responsive means between said terminals.

4. Apparatus as specified in claim 1, wherein said supervisory means comprises an oscillator circuit having a control portion connected to said switching means, having an output portion, and operative to provide an oscillation signal in said output portion which is under the control of the effective conductivity of said control portion, and means connected to said output portion and responsive to said oscillation signal to produce a first effect when said switching means is in said first position and connects an interrupted sensing circuit to said control portion, and to produce a second, different effect when said switching means is in either of said positions and connects either a completed sensing circuit or said device to said control portion.

5. In electrical measuring apparatus including a plurality of sensing circuits, each of which is adapted to include a sensing element individual to that circuit and having an electrical characteristic the value of which is dependent upon the value of a condition to which that element is adapted to be subjected, responsive means adapted to be connected to said circuits and selectively responsive to the values of said characteristics of said elements when the latter are connected to said responsive means, supervisory means, and switching means adjustable into predetermined positions in each of which a corresponding one of said circuits is connected to said supervisory means, the latter being operative to produce a characteristic effect in the absence of a completed sensing circuit connected thereto, the improvement comprising a separate impedance device individually associated with each of said circuits and having a predetermined impedance value, a separate electrical switch individually associated with each of said circuits and the associated one of said devices, connections between each of said switches and the associated ones of said circuits and said devices, connections between said switches and said switching means, each of said switches being operative in one position to connect the associated one of said circuits to said switching means for connection thereby to said supervisory means, and being operative in a second position to connect the associated one of said devices in lieu of the associated circuit to said switching means, said impedance value of each of said devices being that required to simulate the presence of a completed sensing circuit connected to said switching means when the associated switch is in said second position, a separate supply means associated with each of said circuits and adapted to supply a medium which determines the value of the one of said conditions to which the associated sensing element is subjected, a separate control means connected to and individual to each of said supply means and operative in one position to permit the supply of said medium by the associated one of said supply means, and operative in a second position to prevent the supply of said medium by the associated one of said supply means, and a separate interlocking means individual to and interconnecting each of said control means and the associated one of said switches and operative to cause either of the last mentioned control means and switches to occupy its said one position whenever the other of said last mentioned control means and switches occupies its said one position, and to cause either of said last mentioned control means and switches to occupy its said second position whenever the other of said last mentioned control means and switches occupies its said second position.

6. In electrical measuring apparatus including a pair of input terminals adapted to have connected therebetween a sensing circuit including a sensing element having an electrical characteristic the value of which is dependent upon the value of a condition to which said element is adapted to be subjected, responsive means connected between said terminals and responsive to the value of said characteristic when said element is connected in said circuit between said terminals, and supervisory means connected to said responsive means and operative to cause said responsive means to provide a predetermined, characteristic response upon a variation in an electrical characteristic of said circuit to a value which is outside of a predetermined normal range when said circuit is connected between said terminals, the improvement comprising an impedance device having a predetermined impedance value, electrical switching means connected between said terminals, said circuit, and said device and operative in one position to connect solely said circuit between said terminals, and operative in a second position to connect solely said device between said terminals, said impedance value of said device being that required to simulate between said terminals a value of the last mentioned characteristic of said circuit which is within said range when said switching means is in said second position, supply means adapted to supply a medium which determines the value of said condition, control means connected to said supply means and operative in one position to permit the supply of said medium by said supply means, and operative in a second position to prevent the supply of said medium by said supply means, and interlocking means interconnecting said control means and said switching means and operative to cause either of the two last mentioned means to occupy its said one position whenever the other of said two last mentioned means occupies its said one position, and to cause either of said two last mentioned means to occupy its said second position whenever the other of said two last mentioned means occupies its said second position.

7. Apparatus as specified in claim 6, wherein the first mentioned electrical characteristic, to the value of which said responsive means is responsive, is the E. M. F. of said element, wherein the second mentioned electrical characteristic, to the value of which said supervisory means is responsive, is the impedance of said circuit, and wherein the impedance value of said device is such as to prevent said supervisory means from causing said responsive means to provide said characteristic response when said switching means is in said second position.

8. In electrical measuring apparatus including a pair of input terminals adapted to have a thermocouple circuit including a thermocouple connected therebetween, responsive means connected between said terminals and responsive to the E. M. F. of said thermocouple when the latter is connected in said circuit between said terminals, and supervisory means connected to said responsive means and operative to cause the latter to provide a predetermined, characteristic response when said circuit is connected between said terminals but is interrupted by the open-circuiting of said thermocouple, improvement comprising an impedance device having a predetermined impedance value, electrical switching means connected between said terminals, said circuit, and said device and operative in one position to connect solely said circuit between said terminals, and operative in a second position to connect solely said device between said terminals, said impedance value of said device being that required to simulate the presence of an uninterrupted thermocouple circuit between said terminals when said switching means is in said second position, and said thermocouple being adapted to be subjected to the temperature of a space whose temperature is determined by heating means including supply means adapted to supply fuel to said heating means for heating said space, control means connected to said supply means and operative in one position to permit said supply means to supply fuel to said heating means, and operative in a second position to prevent said supply means from supplying fuel to said heating means, and interlocking means interconnecting said control means and said switching means and operative to cause either of the two last mentioned means to occupy its said one position whenever the other of said two last mentioned means occupies its said one position, and to cause either of said two last mentioned means to occupy its said second position whenever the other of said two last mentioned means occupies its said second position.

9. Apparatus as specified in claim 8, wherein said device is a resistor having a resistance value which simulates the presence of an uninterrupted thermocouple circuit between said terminals when said switching means is in said second position.

10. In electrical measuring apparatus including a measuring network having a pair of input terminals adapted to have connected therebetween a sensing circuit including a sensing element having an electrical characteristic the value of which is dependent upon the value of a condition to which said element is adapted to be subjected, said network also having an output portion and measuring network components connected between said input terminals and said output portion and being operative to produce in the latter an electrical output signal of a value dependent upon the value of said characteristic of said element when the latter is connected in said circuit between said terminals, a supervisory component connected in said network and operative to produce an electrical supervisory signal in said output portion in the absence of a completed sensing circuit between said terminals, said component being prevented from producing said supervisory signal in said output portion in the presence of a completed sensing circuit between said terminals, and responsive means connected to said output portion and responsive to the electrical signals produced therein to provide a measure of the value of said characteristic when said element is connected in said circuit between said terminals, and to provide a predetermined, characteristic response to said supervisory signal, the improvement comprising an impedance device having a predetermined impedance value, and electrical switching means connected between said terminals, said circuit, and said device and operative in one position to connect solely said circuit between said terminals, and operative in a second position to connect solely said device between said terminals, said impedance value of said device being that required to simulate the presence of a completed sensing circuit between said terminals when said switching means is in said second position.

11. Apparatus as specified in claim 10, wherein said sensing element is a thermocouple adapted, when connected in said circuit between said terminals, to apply therebetween an E. M. F. dependent in value on the value of said condition, wherein said supervisory component is a first resistor operative to apply a voltage signal to said responsive means in the absence of the connection of said thermocouple between said terminals, and wherein said device is a second resistor having a resistance which simulates the presence of said thermocouple connected between said terminals when said switching means is in said second position.

12. Apparatus as specified in claim 11, wherein said supervisory signal is characterized by being of a value outside of the normal range of values of said output signal, and wherein the resistance of said second resistor is such as to cause a signal within said range to be applied to said responsive means when said switching means is in said second position.

13. In self-balancing electrical measuring apparatus comprising a potentiometric measuring circuit including a slide wire resistor connected in a slide wire branch, a resistance branch having its ends respectively connected to the ends of said slide wire branch, a source of current normally maintaining a current flow through each of said branches, a contact engaging and adjustable along said slide wire resistor, and a pair of terminals adapted to be connected to a sensing circuit including a sensing element constituting a source of voltage to be measured, a responsive device having an input portion connected in series in a detector circuit with said terminals between said contact and an intermediate point on said resistor branch, having an output portion coupled to said contact, and operative on the development of apparatus unbalance and resulting current flow in said input portion to adjust said contact along said slide wire resistor as necessary to eliminate said current flow and rebalance the apparatus, and a supervisory resistor connected between said detector circuit and a point on one of said branches and operative in the absence of an external connection between said terminals to produce a current flow in said detector circuit which is not eliminated by the resulting adjustment of said contact by said responsive device, the improvement comprising a shut-down resistor, and an electrical switching device connected between said terminals, said sensing circuit, and said shut-down resistor and operative in one position to connect solely said sensing circuit between said terminals, and operative in a second position to connect solely said shut-down resistor between said terminals, the resistance value of said shut-down resistor being that required to prevent the last mentioned current flow when said switching device is in said second position.

14. Apparatus as specified in claim 13, wherein the resistances of said supervisory and shut-down resistors are so chosen and related as to cause said resistors to cooperate to effect the adjustment of said contact into a position lying within the normal range of adjustment thereof, corresponding to the normal range of variation of the voltage of said element, when said switching device is in said second position.

15. Apparatus as specified in claim 13, wherein said element is a thermocouple adapted to be subjected to the temperature of a space whose temperature is determined by heating means including supply means adapted to supply fuel to said heating means for heating said space, wherein there are included control means having an input portion coupled to said contact for actuation in accordance with the adjusted position thereof, having a controlling portion coupled to said supply means, and being operative to control the supply of fuel to said heating means and hence the temperature of said space in accordance with the adjusted position of said contact and hence the voltage of said thermocouple, and wherein the adjustment of said contact resulting from said last mentioned current flow is operative to actuate said control means to interrupt at least partially the supply of fuel to said heating means.

16. Apparatus as specified in claim 15, including a control device connected to said supply means and operative in one position to permit said supply means to supply fuel to said heating means under the control of said control means, and operative in a second position to prevent said supply means for supplying fuel to said heating means, and interlocking means interconnecting said control device and said switching device and operative to cause either of the two last mentioned devices to occupy its said one position whenever the other of said two last mentioned devices occupies its said one position, and to cause either of said two last mentioned devices to occupy its said second position whenever the other of said two last mentioned devices occupies its said second position.

17. In self-balancing electrical measuring apparatus comprising a potentiometric measuring circuit including a slide wire resistor connected in a slide wire branch, a resistance branch having its ends respectively connected to the ends of said slide wire branch, a source of current normally maintaining a current flow through each of said branches, a contact engaging and adjustable along said slide wire resistor, and a pair of terminals adapted to be connected selectively to each of a plurality of sensing circuits, each of which includes a separate sensing element individual to that circuit and constituting a source of voltage to be measured, switching means connected between said terminals and said circuits and adjustable into predetermined positions in each of which a corresponding one of said circuits is connected between said terminals, a responsive device having an input portion connected in series in a detector circuit with said terminals between said contact and an intermediate point on said resistor branch, having an output portion coupled to said contact, and operative on the development of apparatus unbalance and resulting current flow in said input portion to adjust said contact along said slide wire resistor as necessary to eliminate said current flow and rebalance the apparatus, and a supervisory resistor connected between said detector circuit and a point on one of said branches and operative in the absence of an external connection between said terminals through said switching means to produce a current flow in said detector circuit which is not eliminated by the resulting adjustment of said contact by said responsive device, the improvement comprising a shut-down resistor individually associated with each of said sensing circuits, a separate electrical switch individually associated with each of said sensing circuits and the associated one of said shut-down resistors, connections between each of said switches and the associated ones of said sensing circuits and said shut-down resistors, and connections between said switches and said switching means, each of said switches being operative in one position to connect the associated one of said sensing circuits to said switching means for connection thereby to said terminals, and being operative in a second position to connect the associated one of said shut-down resistors in lieu of the associated sensing circuit to said switching means for connection thereby to said terminals, the resistance value of each of said shut-down resistors being that required to simulate the presence of a completed sensing circuit connected to said switching means, and hence to prevent the last mentioned current flow, when the associated one of said switches is in its said second position.

References Cited in the file of this patent
UNITED STATES PATENTS

| | | |
|---|---|---|
| 1,496,101 | Schmitt | June 3, 1924 |
| 2,718,148 | Knudsen | Sept. 20, 1955 |

FOREIGN PATENTS

| | | |
|---|---|---|
| 323,022 | Great Britain | Dec. 9, 1929 |